(12) United States Patent
Xiong et al.

(10) Patent No.: US 11,190,039 B2
(45) Date of Patent: Nov. 30, 2021

(54) METHOD OF CHARGING BATTERY AND SYSTEM USING THE SAME

(71) Applicant: Delta Electronics, Inc., Taoyuan (CN)

(72) Inventors: Liang Xiong, Taoyuan (CN); Zhenji Liu, Taoyuan (CN); Wen-Kang Hsu, Taoyuan (CN)

(73) Assignee: Delta Electronics, Inc., Taoyuan (CN)

( * ) Notice: Subject to any disclaimer, the term of this patent is extended or adjusted under 35 U.S.C. 154(b) by 301 days.

(21) Appl. No.: 16/532,583

(22) Filed: Aug. 6, 2019

(65) Prior Publication Data

US 2020/0052501 A1    Feb. 13, 2020

(30) Foreign Application Priority Data

Aug. 13, 2018 (CN) .......................... 201810917944.3

(51) Int. Cl.
*H02J 7/00* (2006.01)
*H01M 10/06* (2006.01)
*H01M 10/44* (2006.01)

(52) U.S. Cl.
CPC ............. *H02J 7/008* (2013.01); *H01M 10/06* (2013.01); *H01M 10/44* (2013.01)

(58) Field of Classification Search
USPC ................................. 320/135, 136, 137, 138
See application file for complete search history.

(56) References Cited

U.S. PATENT DOCUMENTS

2012/0217934 A1 * 8/2012 Zhou ................ H01M 10/44
                                                        320/136
2019/0033397 A1 * 1/2019 Karner ............... G08B 13/1418

FOREIGN PATENT DOCUMENTS

| CN | 1897402 A | * | 1/2007 | |
| CN | 105480106 A |   | 4/2016 | |
| CN | 110417094 A | * | 11/2019 | |
| DE | 102007048620 B4 | * | 1/2018 | ............. B60L 58/33 |
| JP | 2004274849 A | * | 9/2004 | |
| JP | 2012151994 A | * | 8/2012 | |
| KR | 20180002033 A | * | 1/2018 | |

* cited by examiner

*Primary Examiner* — Brian Ngo
(74) *Attorney, Agent, or Firm* — Qinghong Xu

(57) ABSTRACT

A method of charging a battery and a system using the same are provided. The method includes: detecting a terminal voltage of a battery; When the terminal voltage is less than a voltage threshold, performing quick charging which includes: calculating a rising rate of the terminal voltage, comparing the rising rate with a rising rate reference value, and controlling the terminal voltage according to the comparison result; and when the terminal voltage is not less than the voltage threshold, performing low current floating charging which includes: intermittently charging the battery by a predetermined floating charging period, calculating a falling rate of the terminal voltage, comparing the falling rate with a falling rate reference value, controlling the terminal voltage according to the comparison result, in a first time duration of the floating charging period, and suspending charging in a second time duration of the floating charging period.

20 Claims, 10 Drawing Sheets

METHOD OF CHARGING BATTERY AND SYSTEM USING THE SAME

CROSS-REFERENCE TO RELATED APPLICATIONS

This application is based upon and claims priority to Chinese Patent Application No. 201810917944.3, filed on Aug. 13, 2018, the entire content of which is herein incorporated by reference for all purpose.

TECHNICAL FIELD

The present disclosure relates to the field of power electronics, particularly to a method of charging a battery, and a system of charging a battery using the method.

BACKGROUND

Generally, an uninterruptible power supply (UPS) charges a battery when the municipal electric power is normally supplied, and the UPS immediately converts the direct current (DC) power of the battery into an alternating current (AC) power of 220V and supplies it to the load when the municipal electric power is out of supply.

FIG. 1 is a schematic diagram of a circuit of charging a battery in prior art. As shown in FIG. 1, the circuit of charging a battery in prior art generally includes: filter capacitors $C_1$ and $C_2$ connected in parallel with a battery $B_R$ having a DC voltage, that is, a terminal voltage $U_{DC}$, across the two ends of the battery $B_R$; a converter (inverter/rectifier) composed of switches $Q_1$, $Q_2$, $Q_3$ and $Q_4$, whose DC terminals are connected with the two ends of the battery $B_R$; a transformer T, a winding of one side of which is connected to the AC terminals of the converter, and a winding of the other side of which draws power from the AC municipal electric power when the AC municipal electric power is normal and supplies AC power to the load when the AC municipal electric power is interrupted. The specific connection relationship of the above elements is as shown in FIG. 1.

The circuit of charging a battery as shown in FIG. 1 is generally referred to as an online interactive UPS charging circuit that charges the battery $B_R$ by controlling the conduction time of the switches $Q_3$ and $Q_4$.

However, the conventional online interactive UPS charging circuit as shown in FIG. 1 has the following disadvantages:

1. Since the switches $Q_3$ and $Q_4$ are controlled by a fixed duty ratio to perform constant voltage charging, the current in the initial stage of charging is too large, which is easy to cause the electrodes of the battery $B_R$ to be vulcanized.

2. Since the UPS is put into operation only in the case that the AC municipal electric power is interrupted, the battery $B_R$ is hard to be fully charged or discharged. A long-term of such use of the battery $B_R$ will cause electrolyte in the electrodes hard to be decomposed, thus eventually producing lead sulfate, which increases the internal resistance of the battery $B_R$. In addition, the conventional UPS charging method cannot adjust the charging voltage according to the internal resistance of the battery $B_R$, and cannot perform desulfurization on the battery $B_R$ that has been vulcanized.

3. If there is no floating charging mechanism in the last stage of charging, or the floating charging is maintained at all times, or the UPS control board circuit is powered by the battery $B_R$, thus, the battery $B_R$ will be over-discharged when the battery $B_R$ is uncharged for a long time, or the battery $B_R$ will be overcharged when the battery $B_R$ keeps on being in a floating charging state, which will cause the problems such as efficiency decrease of the entire UPS or temperature rise of the UPS.

SUMMARY

The object of the present disclosure is to provide a method of charging a battery, and a system of charging a battery using the method, thereby at least to some extent overcoming the above technical problems due to limitations and disadvantages in prior art.

Other features and advantages of the present disclosure will become apparent from the following detailed description, or be learnt by practicing the present disclosure.

According to an aspect of the invention, a method of charging a battery is provided, including: detecting a terminal voltage of a battery; when the terminal voltage is less than a voltage threshold, performing a step of quick charging, wherein the step of quick charging includes: calculating a rising rate of the terminal voltage, comparing the rising rate with a rising rate reference value and producing a comparison result, and controlling the terminal voltage according to the comparison result; and when the terminal voltage is not less than the voltage threshold, performing a step of low current floating charging, wherein the step of low current floating charging includes: intermittently charging the battery by a predetermined floating charging period, calculating a falling rate of the terminal voltage, comparing the falling rate with a falling rate reference value and producing a comparison result, controlling the terminal voltage according to the comparison result, in a first time duration of the floating charging period, and suspending charging in a second time duration of the floating charging period.

According to another aspect of the invention, a system of charging a battery is further provided, including: a charging circuit, configured to include a switching unit, wherein the switching unit is coupled to the battery; a detecting circuit, configured to be coupled to the battery, to detect a terminal voltage of the battery and output a sampling signal reflecting the terminal voltage; and a control circuit, configured to receive the sampling signal to output a control signal to the charging circuit, so as to control the switching unit to charge the battery, wherein, under a control of the control signal, the switching unit performs a step of quick charging when the terminal voltage is less than a voltage threshold, wherein the step of quick charging includes: calculating a rising rate of the terminal voltage, comparing the rising rate with a rising rate reference value and producing a comparison result, and controlling conduction time of the switching unit according to the comparison result, thereby controlling the terminal voltage, and the switching unit further performs a step of low current floating charging when the terminal voltage is not less than the voltage threshold, wherein the step of low current floating charging includes: intermittently charging the battery by a predetermined floating charging period, calculating a falling rate of the terminal voltage, comparing the falling rate with a falling rate reference value and producing a comparison result, and controlling the conduction time of the switching unit according to the comparison result, thereby controlling the terminal voltage, in a first time duration of the floating charging period, and keeping the switching unit being turned off, thereby suspending charging, in a second time duration of the floating charging period.

The method of charging a battery and the system of charging a battery using the method of the present disclosure can control the charging current only by sampling the terminal voltage of the battery, which can effectively improve charging efficiency of the battery, reduce loss of the whole system, effectively ensure charging amount for the battery, avoid overcharging so as to extend the life of the battery, remind users to replace faulty batteries in time, and is able to select small capacity battery to meet discharging time requirement of the system due to the increased charging efficiency of the battery.

In order to further illustrate the features and technical aspects of the present disclosure, the detailed description and accompanying drawings are provided as follows. While the detailed description and accompanying drawings here are merely used to illustrate the present disclosure, and not used as any restriction to the scope of the claims of the present disclosure.

BRIEF DESCRIPTION OF THE DRAWINGS

The above and other features and advantages of the present disclosure will become more distinct through detailed description of the exemplary embodiments thereof with reference to the following drawings.

DETAILED DESCRIPTION

Figure 1:
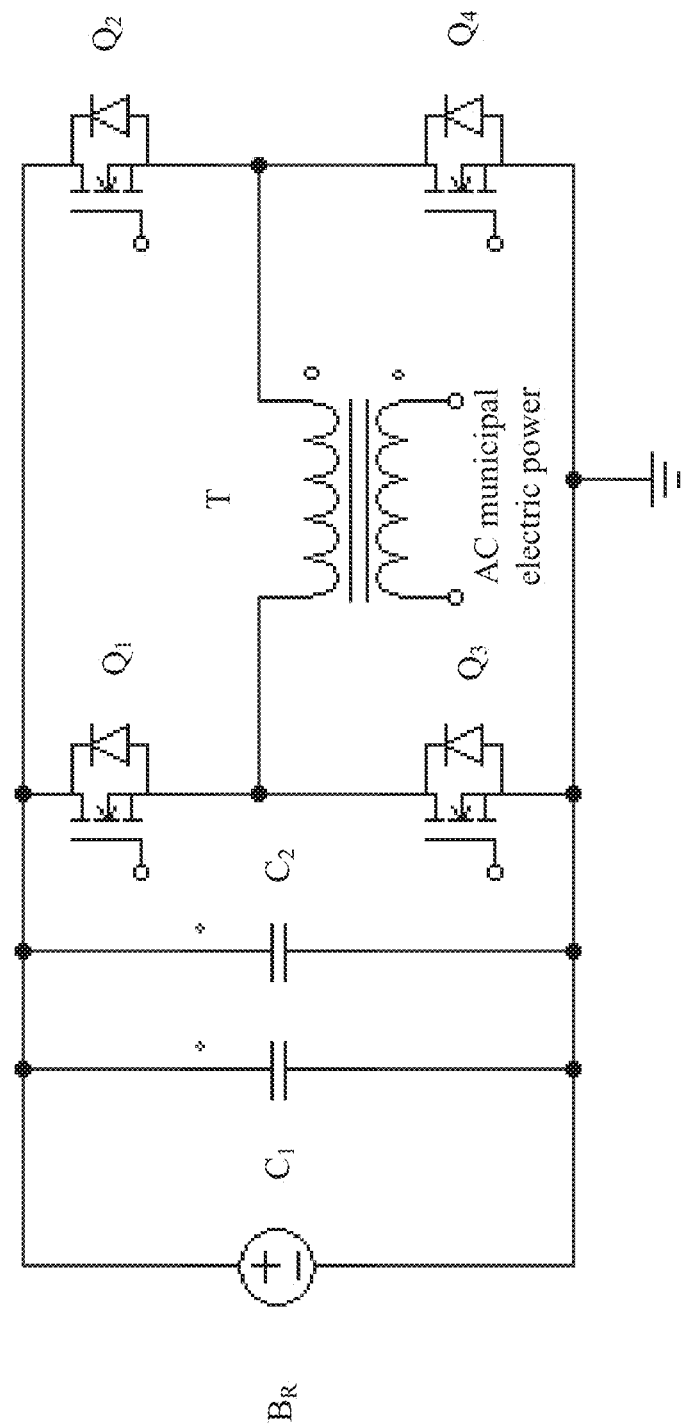
FIG. 1 is a schematic diagram of a circuit of charging a battery in prior art.

Exemplary embodiments will now be described more fully with reference to the accompanying drawings. However, the exemplary embodiments can be realized in a variety of forms and should not be construed as being limited to the embodiments set forth here. On the contrary, these embodiments are provided so that the present disclosure will be comprehensive and complete, and the concept of the exemplary embodiments will be fully conveyed to those skilled in the art. The same reference numerals in the drawings denote the same or similar structures, and thus their detailed description will be omitted.

Furthermore, the described features, structures, or characteristics may be combined in any suitable manner in one or more embodiments. In the following description, numerous specific details are set forth to provide a thorough illustration for the embodiments of the disclosure. However, those skilled in the art will appreciate that the present disclosure may be practiced without one or more of the specific details, or other structures, components, steps, methods, etc., may be employed. In other instances, well-known structures, components or operations are not shown or described in detail to avoid obscuring aspects of the disclosure.

A method of charging a battery and a system of charging a battery using the method of charging a battery, of the present disclosure, will be described below with reference to FIGS. 1-10.

Figure 2:
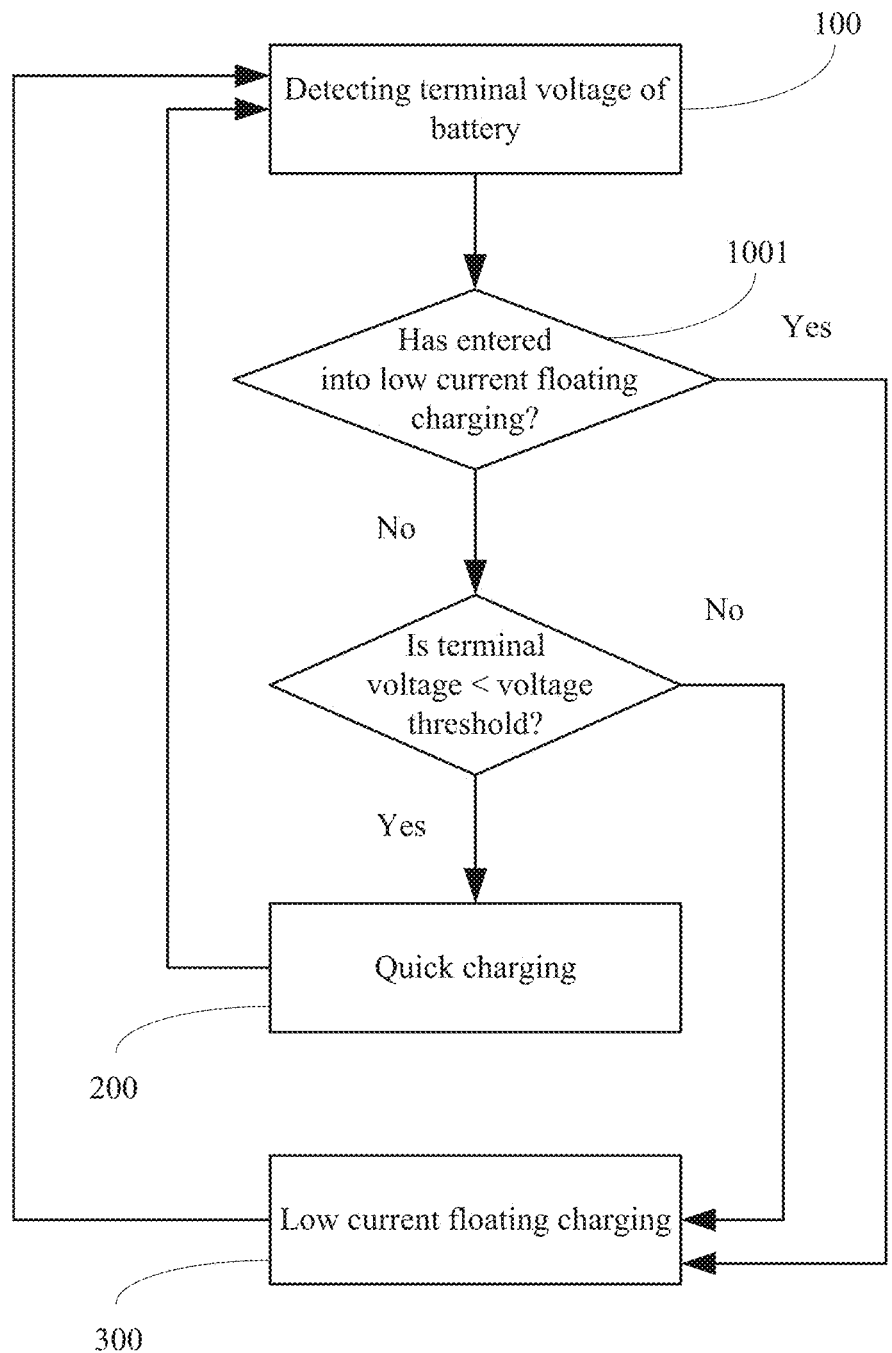
FIG. 2 is a flow chart of a method of charging a battery according to an embodiment of the present disclosure.

The method of charging a battery, of the present disclosure, is a method of controlling online interactive UPS charging, and FIG. 2 is a flow chart of a method of charging a battery according to an embodiment of the present disclosure. As shown in FIG. 2, the method of charging a battery, of the present disclosure, includes the following steps 100-300.

In step 100 of detecting voltage, detecting the terminal voltage $U_{DC}$ of the battery $B_R$ as shown in FIG. 1.

When the terminal voltage $U_{DC}$ is less than a voltage threshold, $U_T$, for example, less than 14±0.2 V or in other words, when stored electricity amount of the battery $B_R$ does not reach, for example, 80% of capacity of the battery, a step 200 of quick charging is performed. Here, "quick" may mean that the charging current in this stage is larger than the charging current in the last stage of charging, so the battery $B_R$ can obtain electric energy relatively quickly in this stage. The stored electricity amount of a certain battery $B_R$ has a relatively fixed relationship with its terminal voltage $U_{DC}$.

In the step 200 of quick charging, calculating a rising rate $P_U$ of the terminal voltage $U_{DC}$, comparing the rising rate $P_U$ with a rising rate reference value $P_{UR}$ and producing a comparison result, and controlling the terminal voltage $U_{DC}$ according to the comparison result. Here, controlling the terminal voltage $U_{DC}$ can be understood as controlling the charging speed of the battery $B_R$, thereby controlling the rising rate $P_U$ of the terminal voltage $U_{DC}$.

When the terminal voltage $U_{DC}$ is not less than the voltage threshold $U_T$, for example, not less than 14±0.2V, or in other words, when the stored electricity amount of the battery $B_R$ reaches, for example, 80% of the capacity of the battery, a step 300 of low current floating charging is performed. Here, "small" may mean that the charging current in this stage is smaller than the charging current in the initial stage, so the battery $B_R$ can obtain electric energy relatively slow in this stage.

In the step 300 of low current floating charging, intermittently charging the battery $B_R$ by a predetermined floating charging period T, calculating a falling rate $P_D$ of the terminal voltage $U_{DC}$, comparing the falling rate $P_D$ with a falling rate reference value $P_{DR}$ and producing a comparison result, and controlling the terminal voltage $U_{DC}$ according to the comparison result, in a first time duration $T_1$ of the floating charging period T, and suspending charging in a second time duration $T_2$ of the floating charging period T. Here, one "floating charging period" T may include one first time duration $T_1$ and one second time duration $T_2$, and the first time duration $T_1$ and the second time duration $T_2$ alternately appear till the battery $B_R$ is fully charged. Here, controlling the terminal voltage $U_{DC}$ can be understood as controlling the charging speed of the battery $B_R$, thereby controlling the falling rate $P_D$ of the terminal voltage $U_{DC}$.

As an embodiment, between step 100 and step 200, the method of charging a battery, of the present disclosure, further includes a step 1001 of determining, determining whether the battery $B_R$ has entered the stage of low current floating charging. In other words, during the normal charging process, if the step 300 has been performed once, the charging process still jumps directly to the step 300 after the step 100 is performed, and the step 200 is not executed any more, unless the system of charging a battery is restarted.

As an embodiment, in the step 200 of quick charging, controlling the terminal voltage $U_{DC}$ according to the comparison result includes: controlling the terminal voltage $U_{DC}$ by adjusting a duty ratio of charging input pulses. Here, the "charging input pulses" may mean, for example, voltage pulses input to the battery $B_R$ when the converter composed of the switches $Q_1$, $Q_2$, $Q_3$ and $Q_4$ as shown in FIG. 1 is used as a rectifier.

As an embodiment, in the step 200 of quick charging, when the rising rate $P_U$ is greater than the rising rate reference value $P_{UR}$, reducing the duty ratio of the charging input pulses, thereby reducing the charging current and reducing the charging speed of the battery $B_R$; and when the rising rate $P_U$ is smaller than the rising rate reference value $P_{UR}$, increasing the duty ratio of the charging input pulses, thereby increasing the charging current and increasing the charging speed of the battery $B_R$.

Figure 3:
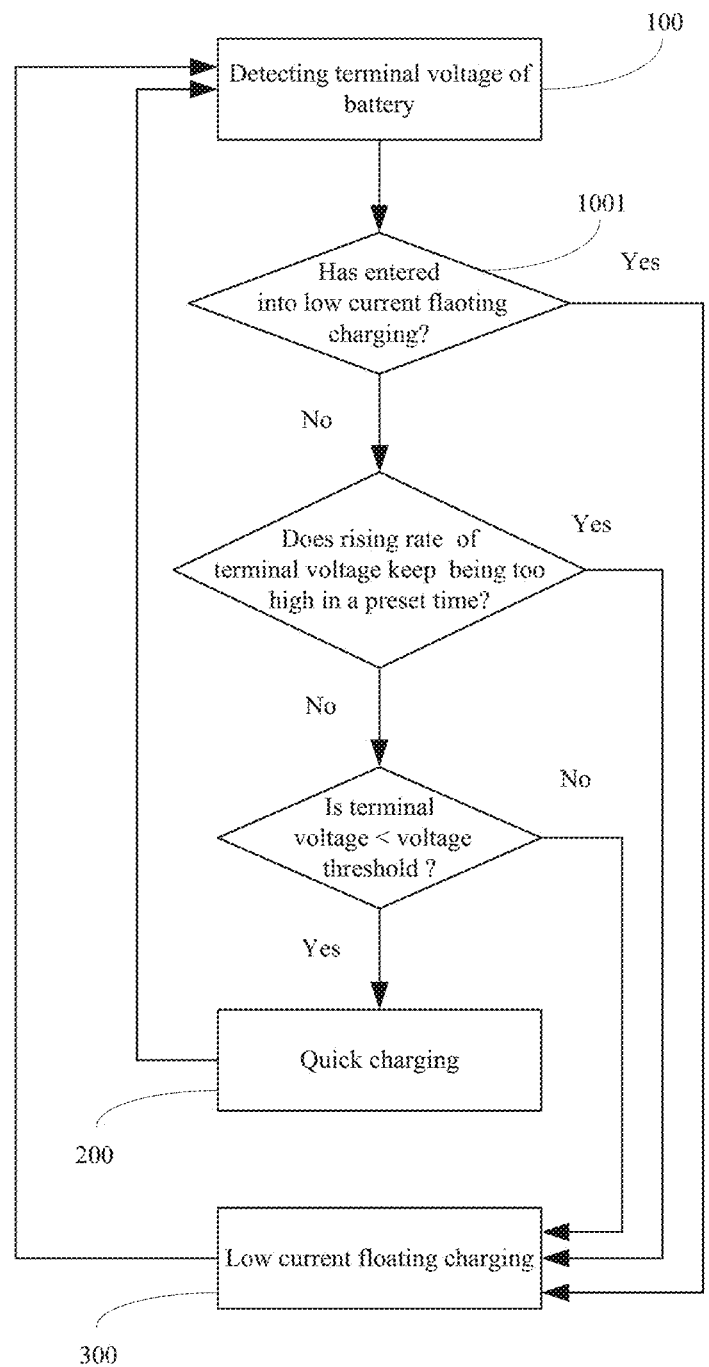
FIG. 3 is a flow chart of a method of charging a battery according to another embodiment of the present disclosure.

FIG. 3 is a flow chart of a method of charging a battery according to another embodiment of the present disclosure. As shown in FIG. 3, as an embodiment, before performing the step 200 of quick charging, if, after a predetermined number of adjustments, the rising rate $P_U$ of the terminal voltage $U_{DC}$ is still greater than the rising rate reference value $P_{UR}$, that is, the rising rate of the terminal voltage keeps being too high in a preset time, it means that the battery $B_R$ at this time has been damaged, then the charging process jumps to the step 300 of low current floating charging, and issues an alarm that the battery $B_R$ needs to be replaced.

Figure 4:
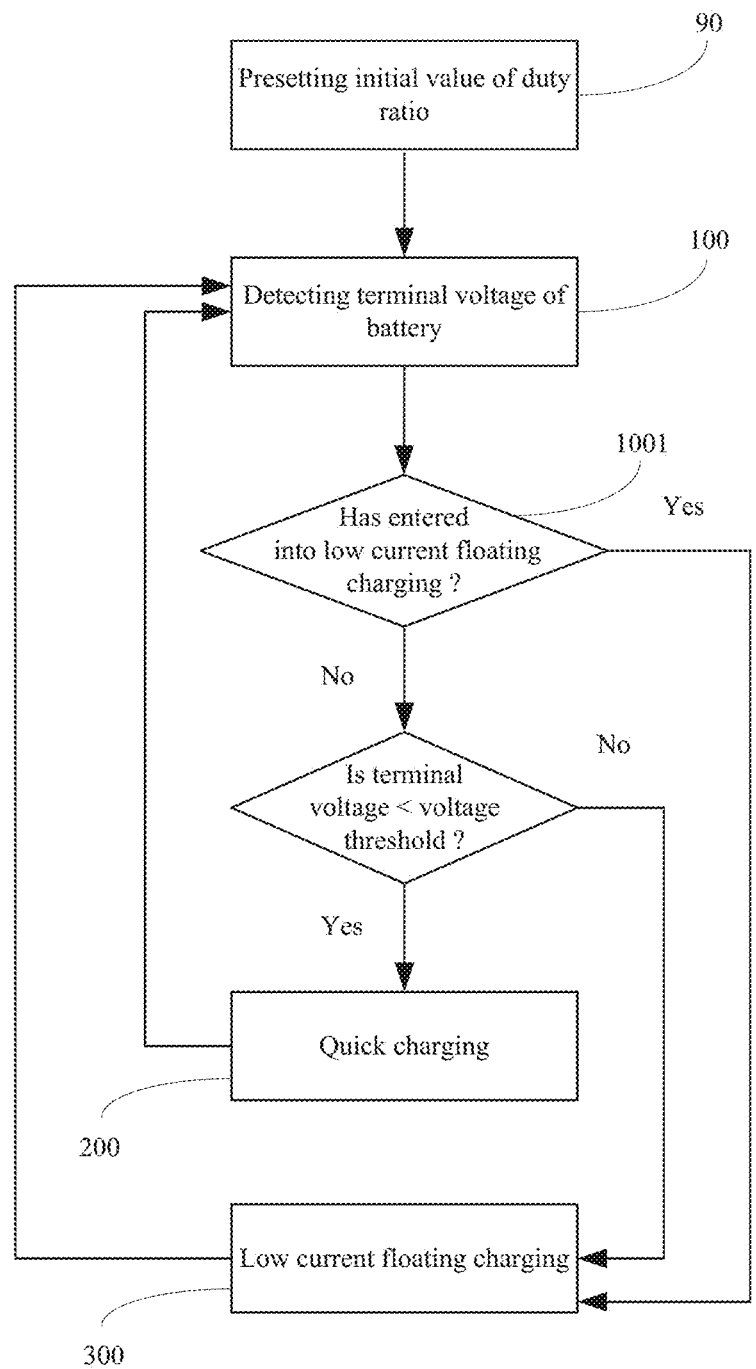
FIG. 4 is a flow chart of a method of charging a battery according to further another embodiment of the present disclosure.

FIG. 4 is a flow chart of a method of charging a battery according to further another embodiment of the present disclosure. As shown in FIG. 4, as an embodiment, before the step 100 of detecting the terminal voltage $U_{DC}$ of the battery $B_R$, the method of charging a battery, of the present disclosure, further includes a step 90 of presetting, presetting an initial value of the duty ratio, and saving it in a nonvolatile memory. Here, the nonvolatile memory may be, for example, EPROM, Flash, or the like.

In the step 200 of quick charging, the adjusted duty ratio may be saved in the nonvolatile memory as an updated initial value of the duty ratio, so that it may be used by the system of charging a battery after the system is restarted.

In another embodiment of the present disclosure, when the circuit of charging a battery includes a switching unit composed of the switches $Q_1$, $Q_2$, $Q_3$ and $Q_4$ as shown in FIG. 1, the duty ratio of the charging input pulses may be increased by increasing the corresponding conduction time of the switching unit, or may be reduced by reducing the corresponding conduction time of the switching unit, so that, accordingly, before the step 100 of detecting the terminal voltage $U_{DC}$ of the battery $B_R$, an initial value of the corresponding conduction time of the switching unit may be preset and saved in the nonvolatile memory. In the step 200 of quick charging, the adjusted conduction time may be saved in the nonvolatile memory as an updated initial value of the conduction time.

Figure 5:
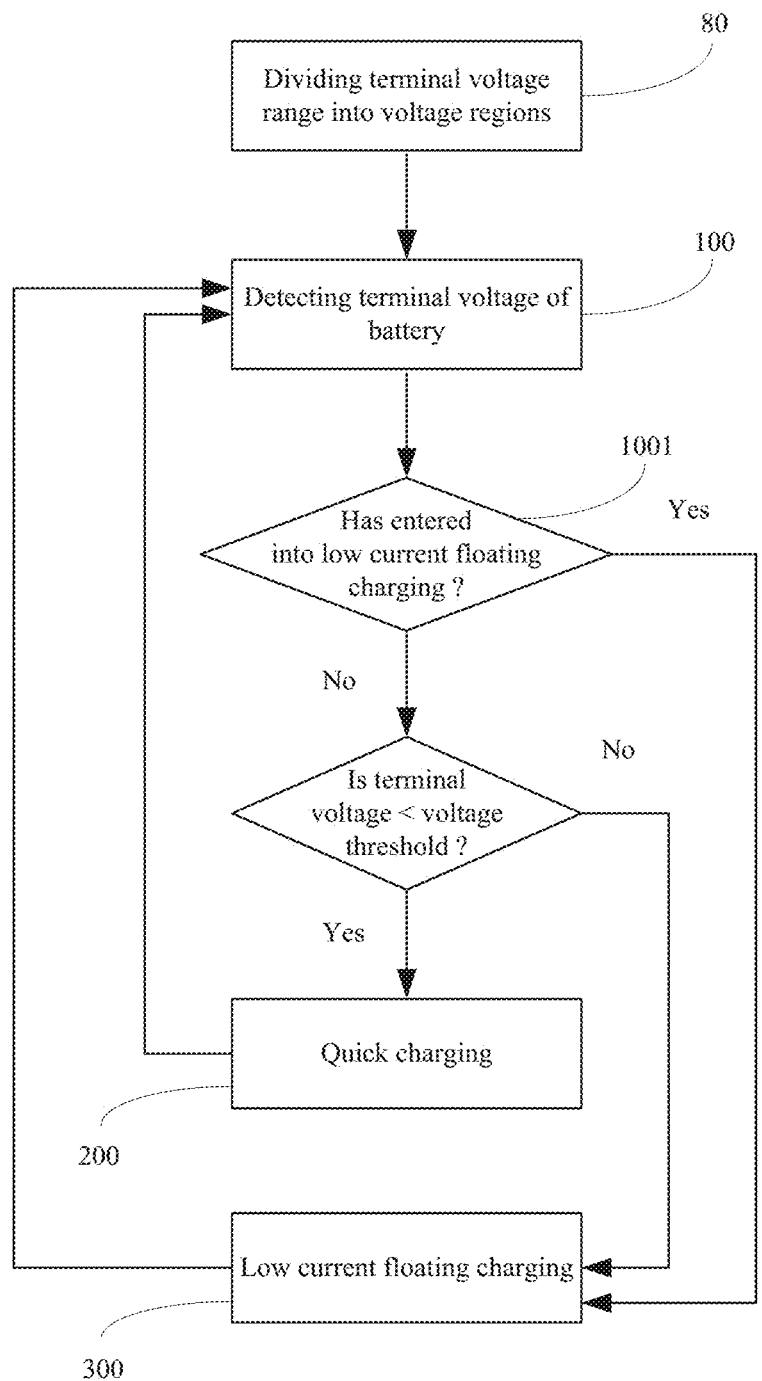
FIG. 5 is a flow chart of a method of charging a battery according to still another embodiment of the present disclosure.

FIG. 5 is a flow chart of a method of charging a battery according to still another embodiment of the present disclosure. As shown in FIG. 5, as an embodiment, before performing the step 200 of quick charging, the method of charging a battery, of the present disclosure, further includes a step 80 of dividing, dividing the variation range of the terminal voltage of the battery $B_R$ into a plurality of voltage regions, wherein each of the terminal voltages $U_{DC}$ belongs to one of the voltage regions, that is, corresponds to one of the voltage regions, and each of the voltage regions corresponds to one of the rising rate reference values $P_{UR}$. Here, the "variation range of the terminal voltage" may refer to the normal battery voltage range of the battery $B_R$, that is, the voltage range that is allowed to be used by the battery $B_R$, for example, for a 12V lead-acid battery, its "variation range of the terminal voltage" is from 9.8V to 14V. Depending on the fineness degree of control, the length of the voltage regions may be one of the various values such as 0.5V, 0.2V, 0.1V, and the like.

Similar to the manner of controlling the terminal voltage $U_{DC}$ in the foregoing step 200 of quick charging, as an embodiment, in the step 300 of low current floating charging, controlling the terminal voltage $U_{DC}$ according to the comparison result includes: controlling the terminal voltage $U_{DC}$ by adjusting the duty ratio of the charging input pulse, as well.

Similar to the manner of controlling the terminal voltage $U_{DC}$ in the foregoing step 200 of quick charging, as an embodiment, in the step 300 of low current floating charging, when the falling rate $P_D$ is greater than the falling rate reference value $P_{DR}$, increasing the duty ratio of the charging input pulses, thereby increasing the charging speed of the battery $B_R$; and when the falling rate $P_D$ is smaller than the falling rate reference value $P_{DR}$, reducing the duty ratio of the charging input pulses, thereby reducing the charging speed of the battery $B_R$.

Still as shown in FIG. 4 above, as an embodiment, before the step 100 of detecting the terminal voltage $U_{DC}$ of the battery $B_R$, the method of charging a battery, of the present disclosure, further includes the preset step 90, presetting the initial value of the duty ratio, and saving it in the nonvolatile memory. Here, the nonvolatile memory may be, for example, EPROM, Flash, or the like, as the above.

In the step 300 of low current floating charging, the adjusted duty ratio may be saved in the nonvolatile memory as an updated initial value of the duty ratio, so that it may be used by the system of charging a battery after the system is restarted.

In another embodiment of the present disclosure, when the circuit of charging a battery includes the above switching unit, the duty ratio of the charging input pulses may be increased by increasing the corresponding conduction time of the switching unit, or may be reduced by reducing the corresponding conduction time of the switching unit, so that, accordingly, before the step 100 of detecting the terminal voltage $U_{DC}$ of the battery $B_R$, an initial value of the corresponding conduction time of the switching unit may be preset and saved in the nonvolatile memory. In the step 300 of low current floating charging, the adjusted conduction time may be saved in the nonvolatile memory as an updated initial value of the conduction time.

Still as shown in FIG. 5 above, as an embodiment, before performing the step 300 of low current floating charging, the method of charging a battery, of the present disclosure, further includes the step 80 of dividing, dividing the variation range of the terminal voltage of the battery $B_R$ into a plurality of voltage regions, wherein each of the terminal voltages $U_{DC}$ belongs to one of the voltage regions, that is, corresponds to one of the voltage regions, and each of the voltage regions corresponds to one of the falling rate reference values $P_{DR}$. Here, the "variation range of the terminal voltage" may refer to the normal battery voltage range of the battery $B_R$, that is, the voltage range that is allowed to be used by the battery $B_R$, for example, for a 12V lead-acid battery, its "variation range of the terminal voltage" is from 9.8V to 14V. Depending on the fineness degree of control, the length of the voltage region may be various values such as 0.5V, 0.2V, 0.1V, and the like.

As an example, the voltage region used in the step 200 of quick charging may be different from the voltage region used in the step 300 of low current floating charging.

As an embodiment, the foregoing battery $B_R$ may be a lead-acid battery.

As an embodiment, before the terminal voltage $U_{DC}$ of the battery $B_R$ is detected, the rising rate reference value $P_{UR}$ and the falling rate reference value $P_{DR}$ may be obtained according to the battery characteristic of the battery $B_R$, and saved in the nonvolatile memory. Here, the "battery characteristic" of the battery $B_R$ may refer to a theoretical charge and discharge curve of the battery $B_R$ provided by the manufacturer who produces the battery $B_R$.

Figure 6:
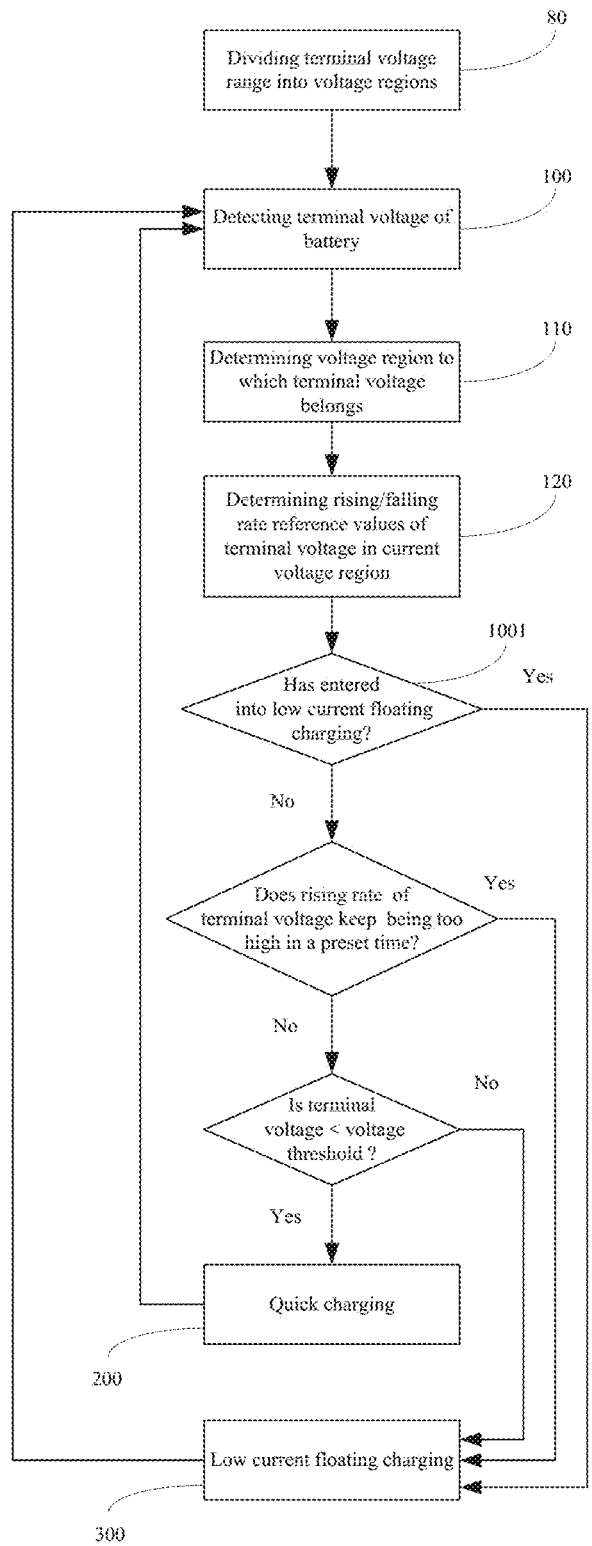
FIG. 6 is a flow chart of a method of charging a battery according to still another embodiment of the present disclosure.

FIG. 6 is a flow chart of a method of charging a battery according to still another embodiment of the present disclosure, for a more complete illustration of the present disclosure. As shown in FIG. 6, the method of charging a battery, of the present disclosure, includes the following steps 80-300.

In the step 80 of dividing, as described above, dividing the variation range of the terminal voltage of the battery $B_R$ into the plurality of voltage regions, which is not repeatedly described here.

In the step 100 of detecting voltage, as described above, detecting the terminal voltage $U_{DC}$ of the battery $B_R$ as shown in FIG. 1, which is not repeatedly described here.

In step 110 of determining, determining the voltage region to which the terminal voltage $U_{DC}$ belongs according to the detecting results in step 100. As mentioned above, each of the terminal voltages $U_{DC}$ belongs to one of the voltage regions, that is, corresponds to one of the voltage regions.

In step 120 of determining, determining the rising rate reference value or the falling rate reference value of the terminal voltage in the current voltage region (corresponding to the stage of quick charging and the stage of low current floating charging, respectively). As mentioned above, each of the voltage regions corresponds to one of the rising rate reference values $P_{UR}$ or one of the falling rate reference values $P_{DR}$.

In the step 1001 of determining, as described above, determining whether the battery $B_R$ has entered the stage of low current floating charging, which is not repeatedly described here.

It is determined whether it is necessary to continue the following step 200 of quick charging, by determining whether that the rising rate $P_U$ of the terminal voltage $U_{DC}$ keeps being too quick (too high) has occurred in a preset time.

It is determined whether it is necessary to end the step 200 of quick charging and enter the step 300 of low current floating charging, by determining whether the terminal voltage $U_{DC}$ is less than the voltage threshold $U_T$, or whether the stored electricity amount of the battery $B_R$ reaches, for example, 80% of the capacity of the battery $B_R$.

The step 200 of quick charging is as described above, which is not repeatedly described here.

The step 300 of low current floating charging as described above, which is not repeatedly described here.

The logical relationship among the steps is as shown in FIG. 6, which is not repeatedly described here.

Figure 7:
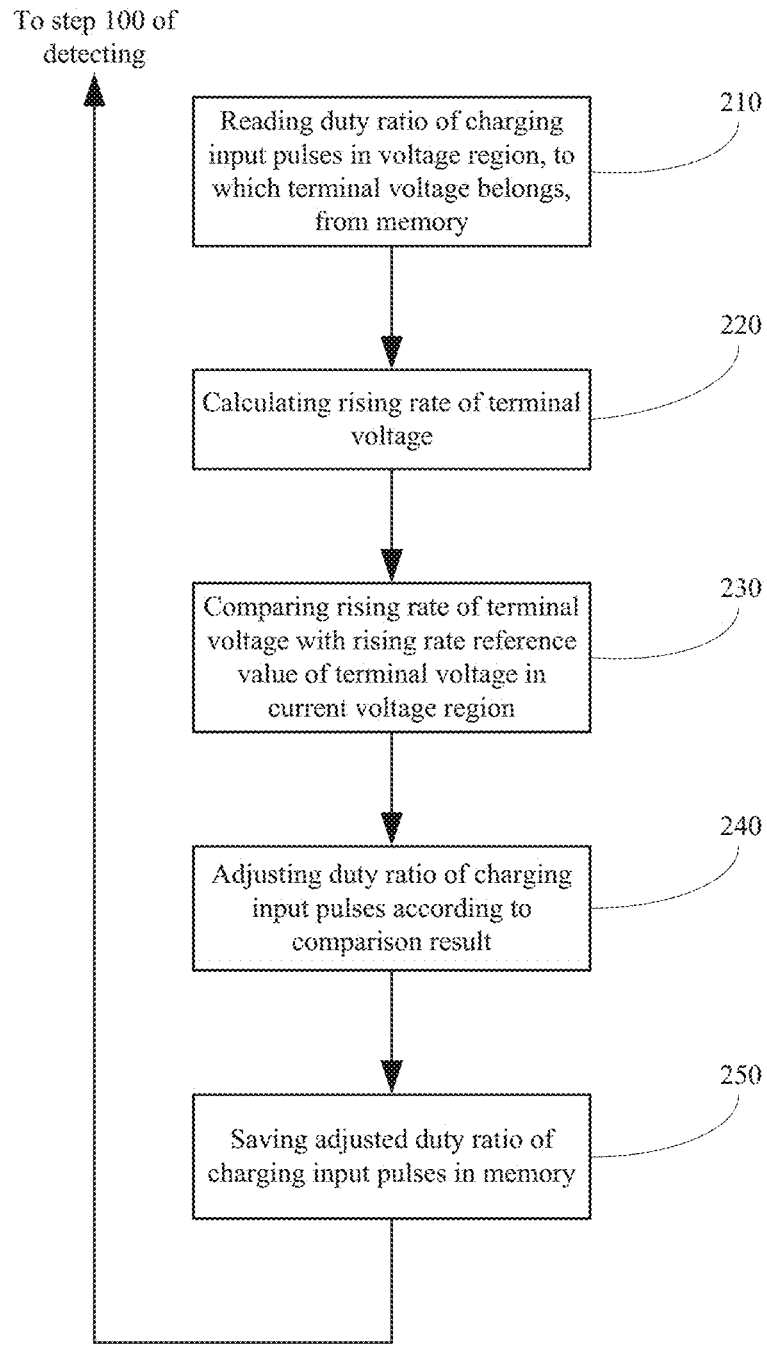
FIG. 7 is a flow chart of a step of quick charging according to an embodiment of the present disclosure.

FIG. 7 is a flow chart of a step of quick charging according to an embodiment of the present disclosure, for a more complete illustration of the present disclosure. As shown in FIG. 7, the step 200 of quick charging of the present disclosure includes the following steps 210-250.

In step 210 of reading, reading the duty ratio of the charging input pulses in the voltage region, to which the terminal voltage $U_{DC}$ belongs, from the memory.

In step 220 of calculating, calculating the rising rate $P_U$ of the terminal voltage $U_{DC}$ by using the detected voltage $U_{DC}$.

In step 230 of comparing, comparing the rising rate $P_U$ of the terminal voltage $U_{DC}$ with the rising rate reference value $P_{UR}$ of the terminal voltage $U_{DC}$ in the current voltage region, and producing a comparison result.

In step 240 of adjusting, adjusting the duty ratio of the charging input pulses according to the comparison result.

In step 250 of saving, saving the adjusted duty ratio of the charging input pulses in the memory as an updated initial value of the duty ratio corresponding to the current voltage region, so that it may be used by the system of charging a battery after the system is restarted.

Figure 8:
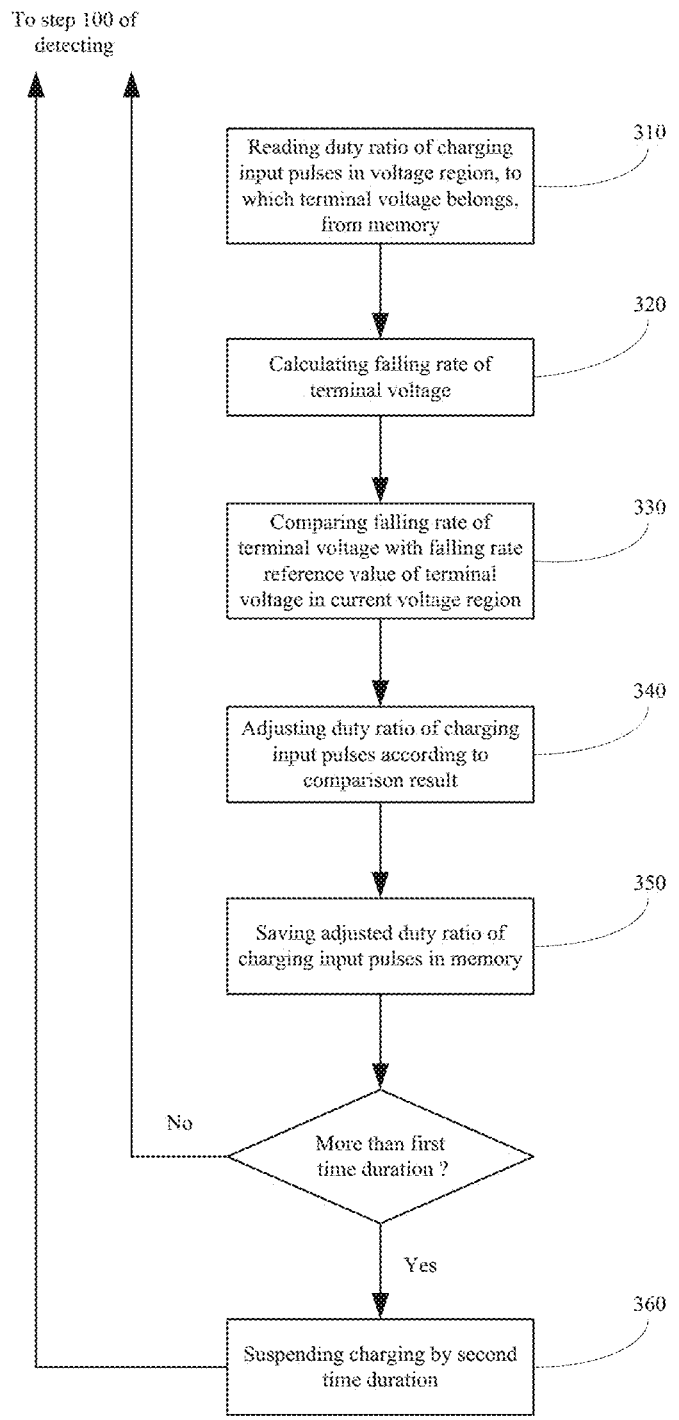
FIG. 8 is a flow chart of a step of low current floating charging according to an embodiment of the present disclosure.

FIG. 8 is a flow chart of a step of low current floating charging according to an embodiment of the present disclosure, for a more complete illustration of the present disclosure. As shown in FIG. 8, the step 300 of low current floating charging of the present disclosure includes the following steps 310-360.

In step 310 of reading, reading the duty ratio of the charging input pulses in the voltage region, to which the terminal voltage $U_{DC}$ belongs, from the memory.

In step 320 of calculating, calculating the falling rate $P_D$ of the terminal voltage $U_{DC}$ by using the detected voltage $U_{DC}$.

In step 330 of comparing, comparing the falling rate $P_D$ of the terminal voltage $U_{DC}$ with the falling rate reference value $P_{DR}$ of the terminal voltage $U_{DC}$ in the current voltage region, and producing a comparison result.

In step 340 of adjusting, adjusting the duty ratio of the charging input pulses according to the comparison result.

In step 350 of saving, saving the adjusted duty ratio of the charging input pulses in the memory as an updated initial value of the duty ratio corresponding to the current voltage region, so that it may be used by the system of charging a battery after the system is restarted.

As described above, in the step 300 of low current floating charging of the present disclosure, the battery $B_R$ is intermittently charged by a predetermined floating charging period T, and only charged in the first time duration $T_1$ of the "floating charging period" T, so, after step 350, and then a following step 360 is performed. As an embodiment, it is possible to further return to the above step 100 of detecting voltage, before proceeding to the next step 360, so as to precisely adjust the charging speed.

In step 360 of suspending, suspending charging for the second time duration $T_2$. After step 360, the charging process returns to the previous step 100 of detecting voltage.

The method of charging a battery, of the present disclosure, has been described above with reference to FIGS. 1-8.

The present disclosure further provides a system of charging a battery using the method of charging a battery as described above with reference to FIGS. 1-8.

Figure 9:
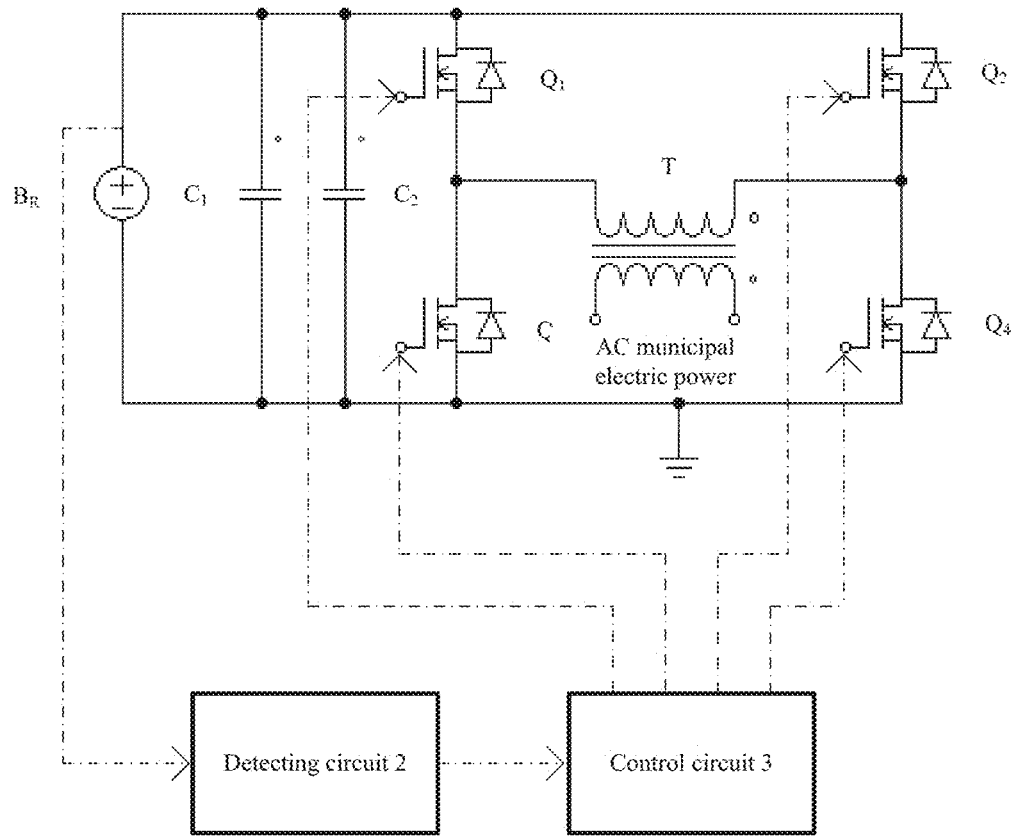
FIG. 9 is a schematic diagram of a system of charging a battery according to an embodiment of the present disclosure.

FIG. 9 is a schematic diagram of a system of charging a battery according to an embodiment of the present disclosure. As shown in FIG. 9, the system of charging a battery, of the present disclosure, includes: the charging circuit as shown in FIG. 1, a detecting circuit 2 and a control circuit 3.

For example, the charging circuit as shown in FIG. 1 is configured to include a switching unit such as a converter composed of switches $Q_1$, $Q_2$, $Q_3$ and $Q_4$, and the switching unit may be coupled to a battery such as the battery $B_R$. The present disclosure is not limited to the charging circuit as shown in FIG. 1.

The detecting circuit 2 is configured to be coupled to, for example, the battery $B_R$, to detect the terminal voltage $U_{DC}$ of the battery $B_R$ and output a sampling signal $S_S$ reflecting the terminal voltage $U_{DC}$.

The control circuit 3 is configured to receive the sampling signal $S_S$ to output a control signal $S_C$ to the charging circuit, so as to control the switching unit to charge the battery $B_R$.

Specifically, under the control of control signal $S_C$, the switching unit performs the above step 200 of quick charging when the terminal voltage $U_{DC}$ is less than the voltage threshold $U_T$, wherein the step 200 of quick charging includes: calculating the rising rate $P_U$ of the terminal voltage $U_{DC}$, comparing the rising rate $P_U$ with the rising rate reference value $P_{UR}$ and producing a comparison result, and controlling the conduction time of the switching unit according to the comparison result, thereby controlling the terminal voltage $U_{DC}$.

Further, under the control of control signal $S_C$, the switching unit performs the above step 300 of low current floating charging when the terminal voltage $U_{DC}$ is not less than the voltage threshold $U_T$, or in other words, when the stored electricity amount of the battery $B_R$ reaches, for example, 80% of the capacity of the battery $B_R$, wherein the step 300 of low current floating charging includes: intermittently charging the battery $B_R$ by the predetermined floating charging period T, calculating the falling rate $P_D$ of the terminal voltage $U_{DC}$, comparing the falling rate $P_D$ with the falling rate reference value $P_{DR}$ and producing a comparison result, and controlling the conduction time of the switching unit according to the comparison result, thereby controlling the terminal voltage $U_{DC}$, in the first time duration $T_1$ of the floating charging period T, and keeping the switching unit being turned off, thereby suspending charging, in the second time duration $T_2$ of the floating charging period T.

As an embodiment, in the step 200 of quick charging, controlling the conduction time of the switching unit according to the comparison result includes: controlling the terminal voltage $U_{DC}$ by adjusting the duty ratio of charging input pulses.

As an embodiment, in the step 200 of quick charging, when the rising rate $P_U$ is greater than the rising rate reference value $P_{UR}$, reducing the conduction time of the switching unit, so as to reduce the duty ratio of the charging input pulses, and when the rising rate $P_U$ is smaller than the rising rate reference value $P_{UR}$, increasing the conduction time of the switching unit, so as to increase the duty ratio of the charging input pulses.

As an embodiment, before performing the step 200 of quick charging, if, after a predetermined number of adjustments, the rising rate $P_U$ of the terminal voltage $U_{DC}$ is still greater than the rising rate reference value $P_{UR}$, the charging process jumps to the step 300 of low current floating charging, and issues an alarm that the battery $B_R$ needs to be replaced.

As an embodiment, before detecting the terminal voltage $U_{DC}$ of the battery $B_R$, presetting an initial value of the conduction time of the switching unit, and saving it in a nonvolatile memory, wherein, in the step 200 of quick charging, the adjusted conduction time may be saved in the nonvolatile memory as the updated initial value of the conduction time.

As an embodiment, before performing the step 200 of quick charging, dividing the variation range of the terminal voltage of the battery $B_R$ into the plurality of voltage regions, wherein each of the terminal voltages $U_{DC}$ belongs to one of the voltage regions, that is, corresponds to one of the voltage regions, and each of the voltage regions corresponds to one of the rising rate reference values $P_{UR}$.

As an embodiment, in the step 300 of low current floating charging, controlling the conduction time of the switching unit according to the comparison result, thereby controlling the terminal voltage $U_{DC}$, includes: controlling the terminal voltage $U_{DC}$ by adjusting the duty ratio of the charging input pulse.

As an embodiment, in the step 300 of low current floating charging, when the falling rate $P_D$ is greater than the falling rate reference value $P_{DR}$, increasing the conduction time of the switching unit, so as to increase the duty ratio of the charging input pulses, and when the falling rate $P_D$ is smaller than the falling rate reference value $P_{DR}$, reducing the conduction time of the switching unit, so as to reduce the duty ratio of the charging input pulses.

As an embodiment, between the step 100 and the step 200, the charging process further includes the step 1001 of determining, determining whether the battery BR has entered the stage of low current floating charging. In other words, during the normal charging process, if the step 300 has been performed once, the charging process still jumps directly to the step 300 after the step 100 is performed, and the step 200 is not executed any more, unless the system of charging a battery is restarted.

As an embodiment, before detecting the terminal voltage $U_{DC}$ of the battery $B_R$, presetting the initial value of the conduction time of the switching unit, and saving it in the nonvolatile memory, wherein, in the step 300 of low current floating charging, the adjusted conduction time may be saved in the nonvolatile memory as the updated initial value of the conduction time.

As an embodiment, before performing the step 300 of low current floating charging, dividing the variation range of the terminal voltage of the battery $B_R$ into the plurality of voltage regions, wherein each of the terminal voltages $U_{DC}$ belongs to one of the voltage regions, that is, corresponds to one of the voltage regions, and each of the voltage regions corresponds to one of the falling rate reference values $P_{DR}$.

As an embodiment, the battery $B_R$ here may be a lead-acid battery.

As an embodiment, before the terminal voltage $U_{DC}$ of the battery $B_R$ is detected, the rising rate reference value $P_{UR}$ and the falling rate reference value $P_{DR}$ may be obtained according to the battery characteristic of the battery $B_R$, and saved in the nonvolatile memory.

Figure 10:
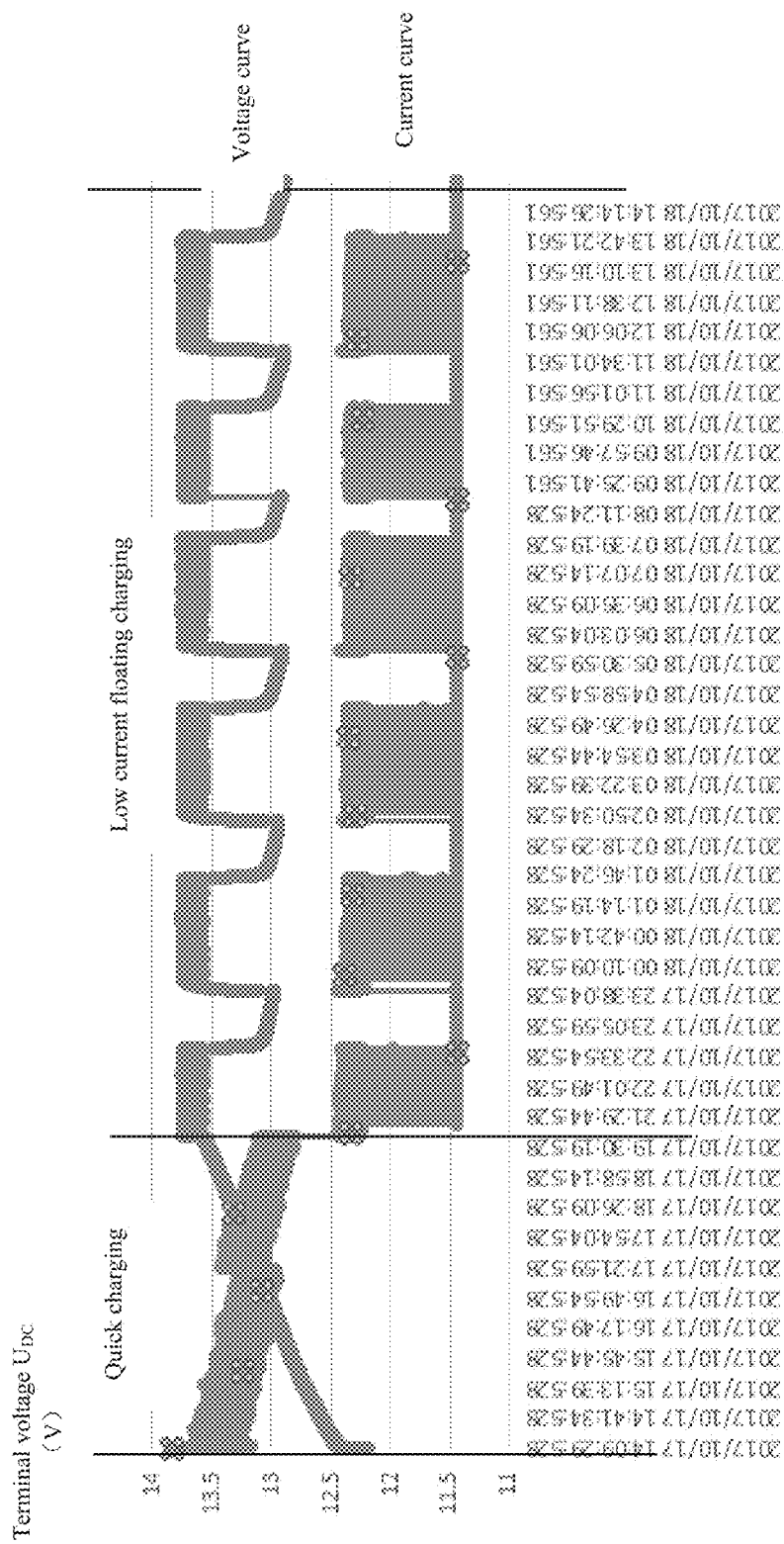
FIG. 10 is a schematic diagram of a charging curve according to an embodiment of the present disclosure.

FIG. 10 is a schematic diagram of a charging curve according to an embodiment of the present disclosure when the circuit of charging as shown in FIG. 9 is employed, which shows the voltage curve and the current curve during charging, for a more complete illustration of the present disclosure. As shown in FIG. 10:

In the stage of quick charging, the terminal voltage $U_{DC}$ of the battery $B_R$ starts to rise from about 12.2 V, and the corresponding charging current is relatively large. Then the charging current gradually decreases.

When the terminal voltage $U_{DC}$ of the battery $B_R$ rises and reaches approximately 13.8V, that is, the voltage threshold $U_T$, it begins to enter into the stage of low current floating charging. In the stage of low current floating charging, the floating charging period, and the first time duration and the second time duration may be set according to the temperature rise condition of the UPS system. For example, the battery $B_R$ begins to be intermittently charged by a floating charging period T of 3 hours, wherein, in the first time duration $T_1$ of 2 hours, the battery $B_R$ is charged by a low current, and in the second time duration $T_2$ of 1 hour, the charging is suspended. In the stage of low current floating charging of the embodiment, when the battery is further required to supply power to the control circuit, etc. in the UPS system at the same time, and the battery itself has self-discharge loss, the terminal voltage $U_{DC}$ of the battery $B_R$ may decrease to some extent or even decrease to the extent less than the voltage threshold $U_T$. However, the method of charging a battery, of the present disclosure may ensure that the battery stably stays in the stage of low current floating charging, unless the system of charging a battery restarts.

The method of charging a battery and the system of charging a battery using the method of the present disclosure can control the charging current only by sampling the terminal voltage of the battery, which can effectively improve charging efficiency of the battery, reduce loss of the whole system, effectively ensure charging amount for the battery, avoid overcharging so as to extend the life of the battery, remind users to replace faulty batteries in time, and is able to select small capacity battery to meet discharging time requirement of the system in low power applications due to the increased charging efficiency of the battery.

The present disclosure has been described by the above related embodiments, but the above embodiments are merely examples for implementing the present disclosure. It must be noted that the disclosed embodiments do not limit the scope of the disclosure. On the contrary, modifications and refinements made without departing from the spirit and scope of the disclosure are within the scope of the disclosure.

What is claimed is:

1. A method of charging a battery, comprising:
   detecting a terminal voltage of a battery;
   when the terminal voltage is less than a voltage threshold, performing a step of quick charging, wherein the step of quick charging includes: calculating a rising rate of the terminal voltage, comparing the rising rate with a rising rate reference value and producing a comparison result, and controlling the terminal voltage according to the comparison result; and
   when the terminal voltage is not less than the voltage threshold, performing a step of low current floating charging, wherein the step of low current floating charging comprises: intermittently charging the battery by a predetermined floating charging period, calculating a falling rate of the terminal voltage, comparing the falling rate with a falling rate reference value and producing a comparison result, controlling the terminal voltage according to the comparison result, in a first time duration of the floating charging period, and suspending charging in a second time duration of the floating charging period.

2. The method of charging a battery according to claim 1, wherein,
   in the step of quick charging, controlling the terminal voltage according to the comparison result includes:
   controlling the terminal voltage by adjusting a duty ratio of charging input pulses,
   wherein, when the rising rate is greater than the rising rate reference value, the duty ratio is reduced, and when the rising rate is less than the rising rate reference value, the duty ratio is increased.

3. The method of charging a battery according to claim 2, wherein,
   before performing the step of quick charging, if, after a predetermined number of adjustments, the rising rate is still greater than the rising rate reference value, the charging jumps to the step of low current floating charging, and an alarm that the battery needs to be replaced is issued.

4. The method of charging a battery according to claim 2, further comprising:
   before detecting the terminal voltage of the battery, presetting an initial value of the duty ratio and saving the initial value of the duty ratio in a nonvolatile memory, wherein,
   in the step of quick charging, the adjusted duty ratio is saved in the nonvolatile memory as an updated initial value of the duty ratio.

5. The method of charging a battery according to claim 1, wherein,
   before performing the step of quick charging, a variation range of the terminal voltage of the battery is divided into a plurality of voltage regions, wherein each of the terminal voltages belongs to one of the voltage regions, and each of the voltage regions corresponds to one of the rising rate reference values.

6. The method of charging a battery according to claim 1, wherein,
   in the step of low current floating charging, controlling the terminal voltage according to the comparison result includes:
   controlling the terminal voltage by adjusting a duty ratio of charging input pulses,
   wherein, when the falling rate is greater than the falling rate reference value, the duty ratio is increased, and when the falling rate is less than the falling rate reference value, the duty ratio is reduced.

7. The method of charging a battery of claim 6, further comprising:
   before detecting the terminal voltage of the battery, presetting an initial value of the duty ratio and saving the initial value of the duty ratio in a nonvolatile memory, wherein,
   in the step of low current floating charging, the adjusted duty ratio is saved in the nonvolatile memory as an updated initial value of the duty ratio.

8. The method of charging a battery according to claim 1, wherein,
   before performing the step of low current floating charging, a variation range of the terminal voltage of the battery is divided into a plurality of voltage regions, wherein each of the terminal voltages belongs to one of the voltage regions, and each of the voltage regions corresponds to one of the falling rate reference values.

9. A system of charging a battery, comprising:
   a charging circuit, configured to comprise a switching unit, wherein the switching unit is coupled to the battery;
   a detecting circuit, configured to be coupled to the battery, to detect a terminal voltage of the battery and output a sampling signal reflecting the terminal voltage; and
   a control circuit, configured to receive the sampling signal to output a control signal to the charging circuit, so as to control the switching unit to charge the battery, wherein,
   under a control of the control signal, the switching unit performs a step of quick charging when the terminal voltage is less than a voltage threshold, wherein the step of quick charging includes: calculating a rising rate of the terminal voltage, comparing the rising rate with a rising rate reference value and producing a comparison result, and controlling conduction time of the switching unit according to the comparison result, thereby controlling the terminal voltage, and the switching unit further performs a step of low current floating charging when the terminal voltage is not less than the voltage threshold, wherein the step of low current floating charging includes: intermittently charging the battery by a predetermined floating charging period, calculating a falling rate of the terminal voltage, comparing the falling rate with a falling rate reference value and producing a comparison result, and controlling the conduction time of the switching unit according to the comparison result, thereby controlling the terminal voltage, in a first time duration of the floating charging period, and keeping the switching unit being turned off, thereby suspending charging, in a second time duration of the floating charging period.

10. The system of charging a battery according to claim 9, wherein in the step of quick charging, controlling conduction time of the switching unit according to the comparison result, thereby controlling the terminal voltage, includes:

controlling the terminal voltage by adjusting a duty ratio of charging input pulses.

11. The system of charging a battery according to claim 10, wherein, in the step of quick charging, when the rising rate is greater than the rising rate reference value, the conduction time is reduced so as to reduce the duty ratio, and when the rising rate is less than the rising rate reference value, the conduction time is increased so as to increase the duty ratio.

12. The system of charging a battery according to claim 10, wherein, before performing the step of quick charging, if, after a predetermined number of adjustments, the rising rate is still greater than the rising rate reference value, the charging jumps to the step of low current floating charging, and an alarm that the battery needs to be replaced is issued.

13. The system of charging a battery of claim 11, further comprising:

before detecting the terminal voltage of the battery, presetting an initial value of the conduction time and saving the initial value of the conduction time in a nonvolatile memory, wherein, in the step of quick charging, the adjusted conduction time is saved in the nonvolatile memory as an updated initial value of the conduction time.

14. The system of charging a battery according to claim 9, wherein, before performing the step of quick charging, a variation range of the terminal voltage of the battery is divided into a plurality of voltage regions, wherein each of the terminal voltages belongs to one of the voltage regions, and each of the voltage regions corresponds to one of the rising rate reference values.

15. The system of charging a battery according to claim 9, wherein, in the step of low current floating charging, controlling the conduction time of the switching unit according to the comparison result, thereby controlling the terminal voltage, includes:

controlling the terminal voltage by adjusting a duty ratio of charging input pulses.

16. The system of charging a battery according to claim 15, wherein, in the step of low current floating charging, when the falling rate is greater than the falling rate reference value, the conduction time is increased so as to increase the duty ratio, and when the falling rate is less than the falling rate reference value, the conduction time is reduced so as to reduce the duty ratio.

17. The system of charging a battery of claim 16, further comprising:

before detecting the terminal voltage of the battery, presetting an initial value of the conduction time and saving the initial value of the conduction time in a nonvolatile memory, wherein, in the step of low current floating charging, the adjusted conduction time is saved in the nonvolatile memory as an updated initial value of the conduction time.

18. The system of charging a battery according to claim 9, wherein, before performing the step of low current floating charging, a variation range of the terminal voltage of the battery is divided into a plurality of voltage regions, wherein each of the terminal voltages belongs to one of the voltage regions, and each of the voltage regions corresponds to one of the falling rate reference values.

19. The system of charging a battery of claim 9, wherein the battery is a lead-acid battery.

20. The system of charging a battery of claim 9, further comprising:

before detecting the terminal voltage of the battery, obtaining the rising rate reference value and the falling rate reference value according to battery characteristic of the battery, and saving the rising rate reference value and the falling rate reference value in a nonvolatile memory.

* * * * *